(12) United States Patent
Ochiai et al.

(10) Patent No.: US 7,041,018 B2
(45) Date of Patent: May 9, 2006

(54) HYDRAULIC CONTROL SYSTEM AND METHOD FOR BELT-DRIVE CONTINUOUSLY VARIABLE TRANSMISSION

(75) Inventors: Tatsuo Ochiai, Kanagawa (JP); Hideshi Wakayama, Kanagawa (JP)

(73) Assignee: Jatco LTD, Fuji (JP)

( * ) Notice: Subject to any disclaimer, the term of this patent is extended or adjusted under 35 U.S.C. 154(b) by 206 days.

(21) Appl. No.: 10/662,442

(22) Filed: Sep. 16, 2003

(65) Prior Publication Data
US 2004/0063525 A1 Apr. 1, 2004

(30) Foreign Application Priority Data
Sep. 30, 2002 (JP) .............................. 2002-285500

(51) Int. Cl.
*F16H 59/00* (2006.01)

(52) U.S. Cl. .......................................... 474/28; 474/18

(58) Field of Classification Search ................... 474/8, 474/18, 28; 701/50, 51; 477/45; 184/11.1, 184/6.1, 6.4
See application file for complete search history.

(56) References Cited

U.S. PATENT DOCUMENTS

| | | | |
|---|---|---|---|
| 5,112,280 A * | 5/1992 | Sato .............................. | 474/18 |
| 6,253,137 B1 * | 6/2001 | Abo et al. ...................... | 701/51 |
| 6,615,966 B1 * | 9/2003 | Kato ......................... | 192/70.12 |
| 6,626,781 B1 * | 9/2003 | Van Der Kamp et al. .... | 474/91 |
| 6,677,685 B1 * | 1/2004 | Pfleger et al. ............ | 290/40 C |
| 2004/0157700 A1 | 8/2004 | Katou | |

OTHER PUBLICATIONS

U.S. Appl. No. 10/674,069 filed Sep. 30, 2003, Sawada et al.
U.S. Appl. No. 10/664,031, filed Sep. 17, 2003, Yamamoto et al.
U.S. Appl. No. 10/674,091, filed Sep. 30, 2003, Jozaki et al.
U.S. Appl. No. 10/670,270, filed Sep. 26, 2003, Nobu.
U.S. Appl. No. 10/670,271, filed Sep. 26, 2003, Nobu.
U.S. Appl. No. 10/670,223, filed Sep. 26, 2003, Wakayama.
U.S. Appl. No. 10/673,549, filed Sep. 30, 2003, Sawada et al.
U.S. Appl. No. 10/670,775, filed Sep. 26, 2003, Shimanaka et al.

* cited by examiner

*Primary Examiner*—Vicky A. Johnson
(74) *Attorney, Agent, or Firm*—Foley & Lardner LLP

(57) ABSTRACT

Hydraulic control system and method for a belt-drive continuously variable transmission (CVT). The system includes an oil pump operative to produce an oil pressure and an oil flow amount which are supplied to the CVT, a pressure regulator valve operative to regulate the oil pressure, an oil supply passage for supplying oil to the belt on a downstream side of the pressure regulator valve, means for detecting an engine operating condition and generating a signal indicative of the engine operating condition detected, and a controller programmed to calculate a CVT input torque based on the signal, calculate a required belt lubricating oil flow amount to be supplied to the belt on the basis of the signal and the CVT input torque, determine a minimum speed of the oil pump based on the required belt lubricating oil flow amount, and control the oil pump at the minimum speed.

16 Claims, 7 Drawing Sheets

FIG.4
|  | PULLEY SPEED RATIO | PRIMARY PULLEY SPEED | MAP |
|---|---|---|---|
| INPUT TORQUE LARGE | a | A | 1 |
| | b | B | 2 |
| | c | C | 3 |
| INPUT TORQUE MEDIUM | a | A | 4 |
| | b | B | 5 |
| | c | C | 6 |
| INPUT TORQUE SMALL | a | A | 7 |
| | b | B | 8 |
| | c | C | 9 |
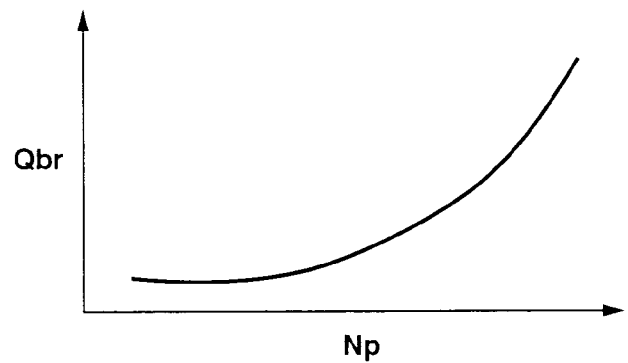
FIG.5
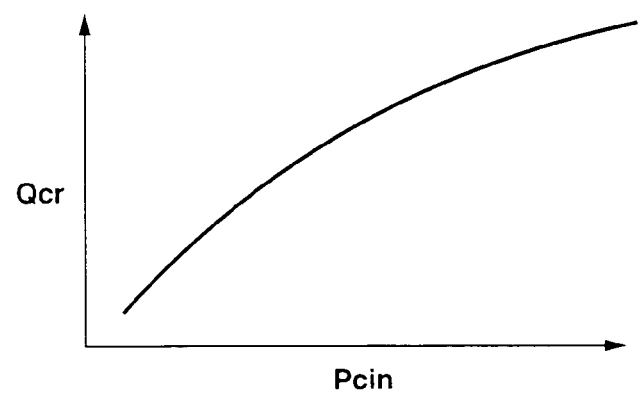
FIG.6

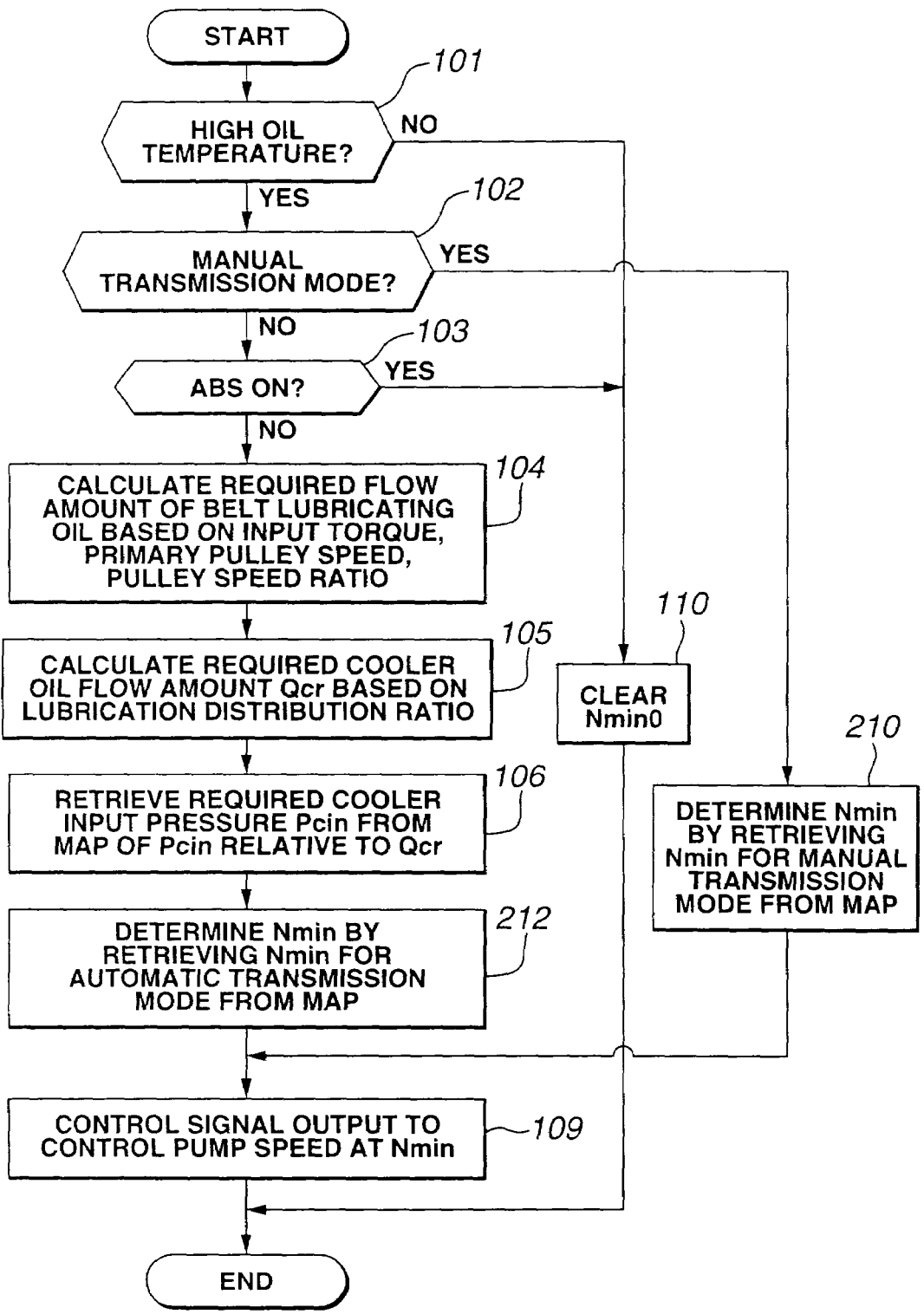

HYDRAULIC CONTROL SYSTEM AND METHOD FOR BELT-DRIVE CONTINUOUSLY VARIABLE TRANSMISSION

BACKGROUND OF THE INVENTION

The present invention relates to a hydraulic control system and method for a belt-drive continuously variable transmission (CVT).

One example of such a hydraulic control system is known, which includes an oil pump and a pressure regulator valve coupled with the oil pump. The pressure regulator valve adjusts a hydraulic pressure as a pulley clamping pressure which is discharged from the oil pump. A clutch regulator valve disposed on the downstream side of the pressure regulator valve adjusts a hydraulic pressure to be supplied to a select switching valve. A torque converter regulator valve disposed on the downstream side of the clutch regulator valve adjusts a hydraulic pressure to be supplied to a lockup control valve. An oil cooler for maintaining oil at a constant temperature is disposed on the downstream side of the torque converter regulator valve. A lubricating oil supply member, for example, an oil supply nozzle, for supplying the oil for lubricating the belt of the CVT is disposed on the downstream side of the oil cooler. In the belt-drive CVT, an oil amount leaking from lubrication parts of the CVT increases under high oil temperature condition. This will prevent the oil from being supplied in a sufficient amount through the oil supply nozzle. In order to maintain a required flow amount of the belt lubricating oil at high oil temperature, a conventional art controls oil pump speed, namely, engine speed, by controlling a transmission ratio of the CVT based on a predetermined flow amount of the oil discharged from the oil pump which is set corresponding to each oil temperature.

SUMMARY OF THE INVENTION

An oil amount required for lubricating the belt of the CVT is usually varied depending on operating conditions of a pulley ratio of the belt-drive CVT, vehicle speed, input torque and the like. Therefore, the conventional art which determines an oil flow amount discharged from the oil pump on the basis of only the oil temperature, must determine a required maximum oil flow amount at each oil temperature. This will cause excessive increase in the oil flow amount discharged from the oil pump to thereby enhance the engine speed, resulting in deterioration in fuel economy. Further, in a case where the engine speed is excessively increased, engine brake effect will not be sufficiently performed and vehicle drivability will be deteriorated.

It is an object of the present invention to eliminate the above-described disadvantages and provide a hydraulic control system and method for a belt-drive continuously variable transmission (CVT), which is capable of determining an appropriate oil flow amount required for lubricating a belt of the CVT on the basis of vehicle operating conditions and capable of restricting an unnecessary oil flow amount for the lubrication, serving for reducing the engine speed in high oil temperature condition.

In one aspect of the present invention, there is provided a hydraulic control system for a belt-drive continuously variable transmission (CVT) of a vehicle, the CVT including a belt, the hydraulic control system comprising:

an oil pump operative to produce an oil pressure and an oil flow amount which are supplied to the CVT;

a pressure regulator valve operative to regulate the oil pressure produced by the oil pump;

a belt lubricating oil supply passage for supplying oil to the belt on a downstream side of the pressure regulator valve;

engine operating condition detecting means for detecting an engine operating condition and generating a signal indicative of the engine operating condition detected; and a controller for controlling the oil flow amount based on the signal, the controller being programmed to:

calculate a CVT input torque based on the signal;

calculate a required belt lubricating oil flow amount to be supplied to the belt on the basis of the signal and the CVT input torque;

determine a minimum speed of the oil pump based on the required belt lubricating oil flow amount; and control the oil pump at the minimum speed.

In another aspect of the invention, there is provided a method for controlling a belt-drive continuously variable transmission (CVT) of a vehicle, the CVT including a belt, the vehicle including an oil pump operative to produce an oil pressure and an oil flow amount which are supplied to the CVT, a pressure regulator valve operative to regulate the oil pressure produced by the oil pump, and a belt lubricating oil supply passage on a downstream side of the pressure regulator valve, the method comprising:

generating an engine operating condition signal indicative of an engine operating condition;

calculating a CVT input torque based on the engine operating condition signal;

calculating a required belt lubricating oil flow amount to be supplied to the belt on the basis of the engine operating condition signal and the CVT input torque;

determining a minimum speed of the oil pump based on the required belt lubricating oil flow amount; and controlling the oil pump at the minimum speed.

BRIEF DESCRIPTION OF THE DRAWINGS

FIG. 4 is a table for selecting a map used for calculation of a required belt lubricating oil flow amount.

FIG. 5 is a map showing a relationship between required oil flow amount and primary pulley speed.

FIG. 6 is a map showing a relationship between cooler oil flow amount and cooler input pressure corresponding to line pressure.

FIG. 11 is a flow chart of a routine of determining oil pump minimum speed which is executed in the second embodiment.

DETAILED DESCRIPTION OF THE INVENTION

Figure 1:
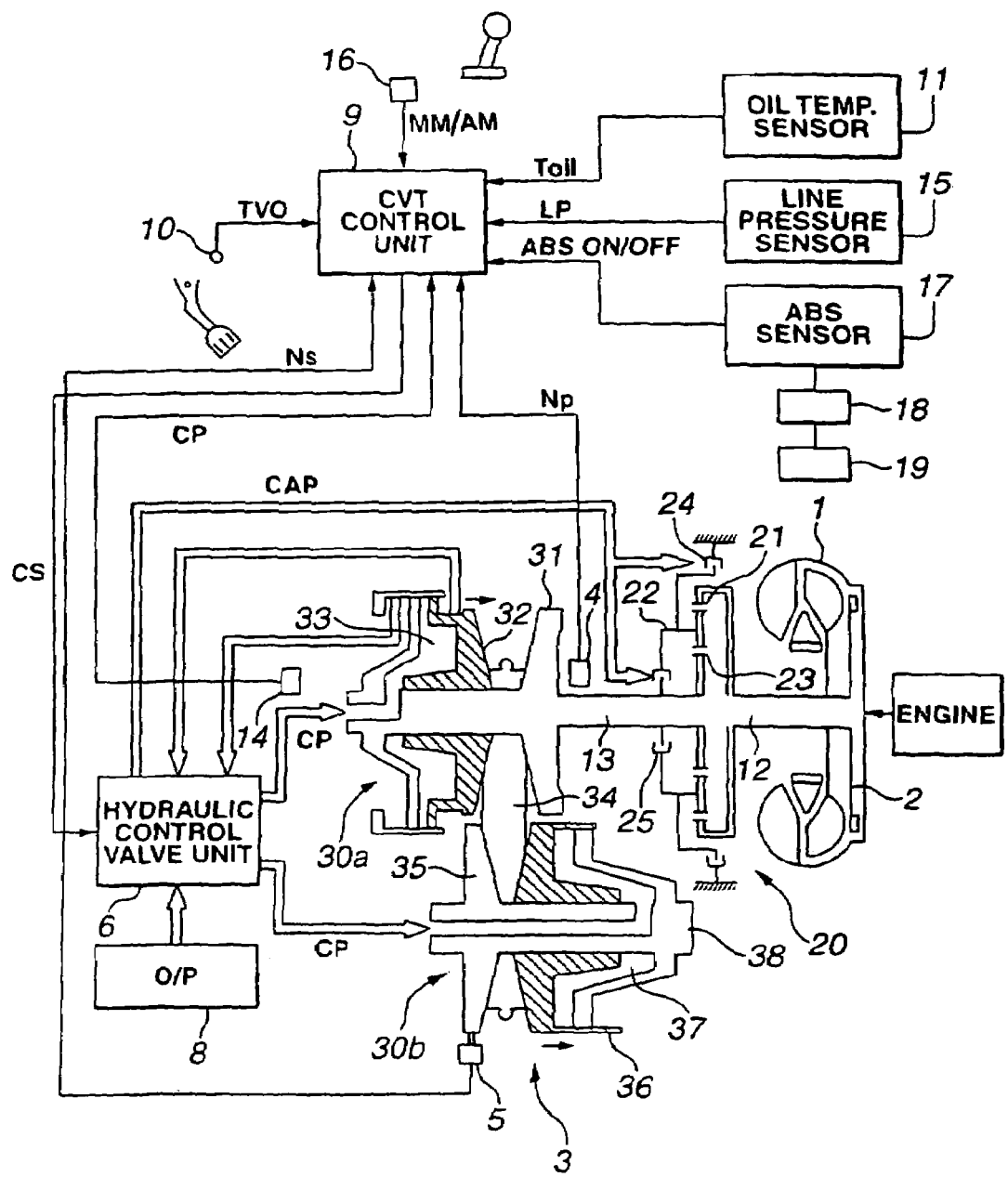
FIG. 1 is a schematic diagram illustrating a control system of an automatic transmission equipped with a belt-drive continuously variable transmission (CVT), according to a first embodiment of the present invention.

Referring to FIG. 1, there is shown a hydraulic control system for belt-drive continuously variable transmission (CVT) 3, according to a first embodiment of the present invention. As illustrated in FIG. 1, CVT 3 is coupled to an engine via lockup clutch 2 for direct connection between CVT 3 and the engine. Torque converter 1 is connected to output shaft 12 of the engine. Forward-reverse switching mechanism 20 is disposed on an output side of torque converter 1. Forward-reverse switching mechanism 20 includes a planetary gear train, reverse brake 24 and forward clutch 25. The planetary gear train includes ring gear 21 coupled to output shaft 12 of the engine, pinion carrier 22, and sun gear 23 coupled to input shaft 13 of CVT 3. Reverse brake 24 is operative to fix pinion carrier 22 to a transmission case. Forward clutch 25 is operative to couple input shaft 13 of CVT 3 and pinion carrier 22 with each other. Oil pump 8 is mechanically coupled to the engine and directly driven by the engine.

CVT 3 includes primary pulley 30a, secondary pulley 30b and belt 34 connecting primary and secondary pulleys 30a and 30b to thereby transmit the rotation force of primary pulley 30a to secondary pulley 30b. Primary pulley 30a is disposed on a rear end portion of input shaft 13. Primary pulley 30a includes fixed disk 31 rotatable together with input shaft 13, and moveable disk 32 opposed to fixed disk 31 in an axial direction of input shaft 13. Fixed and moveable disks 31 and 32 have generally conical shapes and cooperate with each other to form a V-groove in which belt 34 is engaged. Moveable disk 32 is axially moved on input shaft 13 by an oil pressure supplied to primary pulley cylinder chamber 33. Secondary pulley 30b is disposed on driven shaft 38. Secondary pulley 30b includes fixed conical disk 35 rotatable together with driven shaft 38, and moveable disk 36 opposed to fixed disk 35 in an axial direction of driven shaft 38. Fixed and moveable disks 35 and 36 have generally conical shapes and cooperate with each other to form a V-groove in which belt 34 is engaged. Moveable disk 36 is axially moved on driven shaft 38 by an oil pressure supplied to secondary pulley cylinder chamber 37. A driving gear, not shown, is fixed onto driven shaft 38. The driving gear is operative to drive a driving shaft connected to a wheel, via a pinion on an idler shaft, a final gear and a differential gear.

The rotation force outputted from output shaft 12 of the engine is transmitted to input shaft 13 of CVT 3 via torque converter 1 and forward-reverse switching mechanism 20. The rotation force of input shaft 13 is successively transmitted to primary pulley 30a, belt 34, secondary pulley 30b, driven shaft 38, the driving gear, an idler gear, the idling shaft, the pinion, the final gear and the differential gear. Upon thus transmitting the rotation force, moveable disk 32 of primary pulley 30a and moveable disk 36 of secondary pulley 30b are axially moved on input and driven shafts 13 and 38, respectively, to change a width of the V-groove which extends in the axial direction of input and driven shafts 13 and 38. A radius of curvature of a circular arc formed by V-belt 34 contacted with pulleys 30a and 30b is continuously varied by changing the V-groove width. A pulley speed ratio between the rotational speed of primary pulley 30a and the rotational speed of secondary pulley 30b, namely, a transmission ratio of CVT 3, can be thus changed. The change of the V-groove width is conducted by controlling the oil pressure supplied to primary pulley cylinder chamber 33 and secondary pulley cylinder chamber 37. The hydraulic control is performed by CVT control unit or controller 9.

A plurality of sensors are electronically connected to CVT controller 9 and detect engine operating conditions. The sensors includes primary pulley speed sensor 4, secondary pulley speed sensor 5, throttle position sensor 10, oil temperature sensor 11, pulley clamping pressure sensor 14, line pressure sensor 15, transmission mode sensor 16, and anti-lock brake system (ABS) sensor 17. Primary pulley speed sensor 4 detects the rotational speed of primary pulley 30a and generates signal Np indicative of the detected primary pulley speed. Secondary pulley speed sensor 5 detects the rotational speed of secondary pulley 30b and generates signal Ns indicative of the detected secondary pulley speed. Throttle position sensor 10 detects an opening degree of a throttle valve and generates signal TVO indicative of the detected throttle opening degree. Oil temperature sensor 11 detects a temperature of the oil in CVT 3 and generates signal Toil indicative of the detected oil temperature. Pulley clamping pressure sensor 14 detects a pulley clamping pressure supplied to each of primary and secondary pulley cylinder chambers 33 and 37 so as to clamp belt 34, and generates signal CP indicative of the detected pulley clamping pressure. Line pressure sensor 15 detects a line pressure and generates signal LP indicative of the detected line pressure. Transmission mode sensor 16 detects a manual transmission mode or an automatic transmission mode which is selected based on a position of a transmission mode selector switch provided on a shift lever, not shown. The manual transmission mode allows to manually change the pulley speed ratio. The automatic transmission mode allows to automatically change the pulley speed ratio. Transmission mode sensor 16 generates manual mode signal MM when the manual transmission mode is selected, and automatic mode signal AM when the automatic transmission mode is selected. ABS sensor 17 detects whether or not ABS is in operation and generates ABS control signal ABS control ON/OFF indicative of the ABS in operation or out of operation. ABS includes a wheel speed sensor, not shown, G sensor, not shown, ABS actuator 18 for controlling a braking pressure, and ABS control unit 19 for generating a control signal to ABS actuator 18 based on the detected wheel speed and acceleration.

CVT controller 9 receives the signals generated from these sensors, processes the signals, and develops and transmits control signal CS to hydraulic control valve unit 6. As explained in detail later, CVT controller 9 is programmed to calculate CVT input torque TQin based on throttle opening degree signal TVO, calculate required belt lubricating oil flow amount Qbr to be supplied to belt 34 on the basis of oil temperature signal Toil and CVT input torque TQin, determine oil pump minimum speed Nmin based on required belt lubricating oil flow amount Qbr, and control oil pump 8 at minimum speed Nmin. CVT controller 9 may be a microcomputer including central processing unit (CPU), input and output ports (I/O), read-only memory (ROM), random access memory (RAM) and a common data bus.

Hydraulic control valve unit 6 receives a plurality of signals indicative of an accelerator opening degree, the transmission ratio of CVT 3, the rotational number of input shaft 13, a primary pulley pressure, and the like. Hydraulic control valve unit 6 controls the transmission ratio of CVT 3 by supplying pulley clamping pressure CP to primary and secondary pulley cylinder chambers 33 and 37 based on the input signals.

Figure 2:
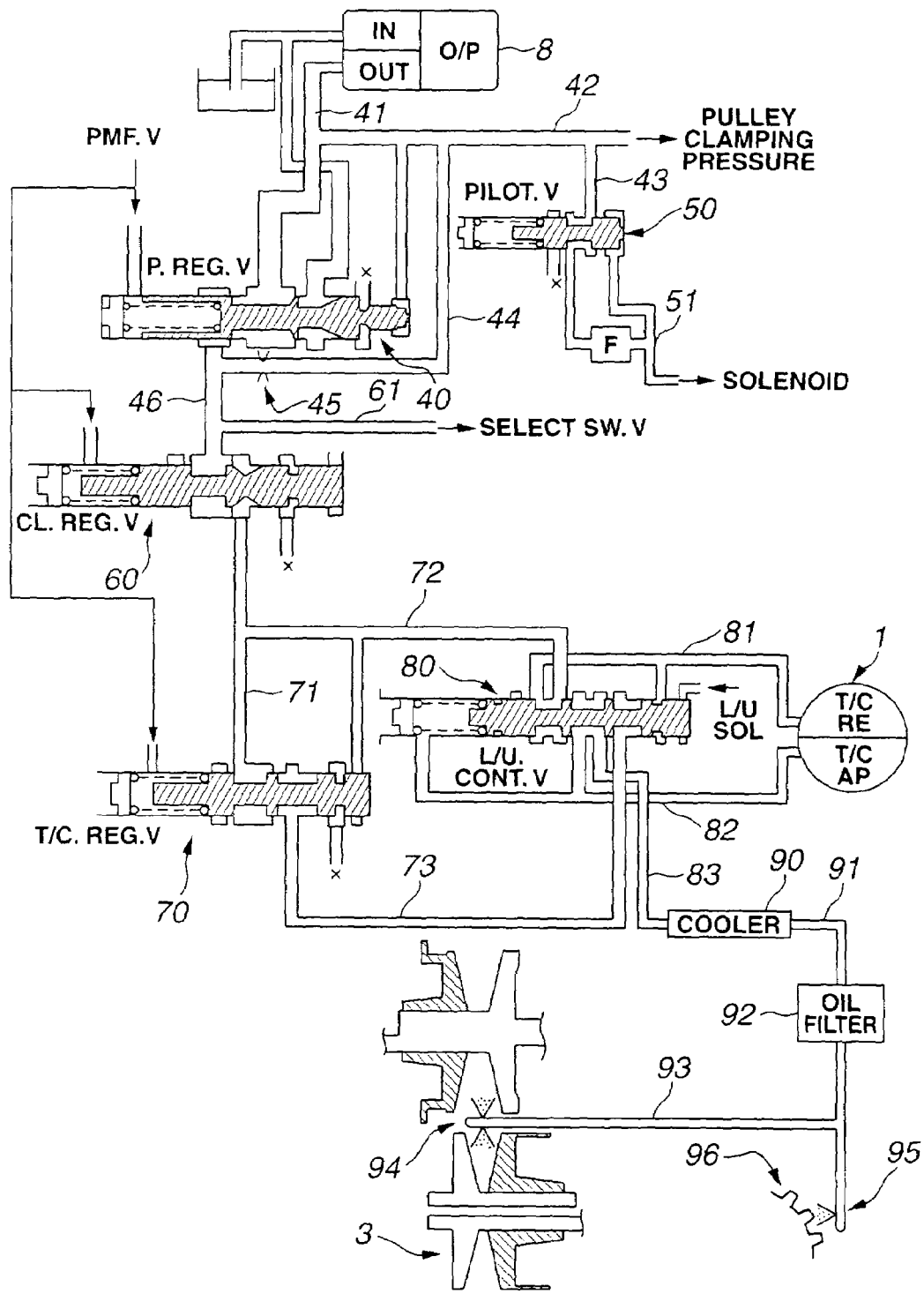
FIG. 2 is a hydraulic circuit diagram of the CVT of FIG. 1.

FIG. 2 shows a hydraulic circuit used in the first embodiment of the hydraulic control system. As illustrated in FIG. 2, pressure regulator valve 40 is connected to oil pump 8 via oil passage 41. Pressure regulator valve 40 regulates a discharge pressure as line pressure (pulley clamping pressure), which is produced from oil pump 8. Oil passage 42 is communicated with oil passage 41 and supplies the pulley clamping pressure to primary pulley cylinder chamber 33 and secondary pulley cylinder chamber 37. Oil passage 43 is communicated with oil passage 42 and supplies an initial pressure to pilot valve 50.

An oil pressure drained from pressure regulator valve 40 is supplied to clutch regulator valve 60 via oil passage 46. Oil passage 46 is communicated with oil passage 44 which is communicated with oil passage 42 and has orifice 45. Clutch regulator valve 60 regulates the oil pressure in oil passage 46 and the oil pressure in oil passage 44 and supplies a forward clutch applying pressure to forward clutch 25 via oil passage 61, a select switching valve and a select control valve. With this arrangement, the forward clutch applying pressure is regulated smaller than the pulley clamping pressure.

Pilot valve 50 controls the oil pressure at a constant value and supplies the oil pressure to a select switching solenoid valve and a lockup solenoid valve via oil passage 51. The output pressure supplied to the select switching solenoid valve is supplied to a select switching valve and controls the operation of the select switching valve. The output pressure supplied to the lockup solenoid valve is supplied to the select switching valve.

Torque converter regulator valve 70 is supplied with the oil pressure drained from clutch regulator valve 60 via oil passage 71. Torque converter regulator valve 70 regulates the oil pressure in oil passage 71 and the oil pressure in oil passage 72. The oil pressure in oil passage 72 is supplied to lockup control valve 80 which supplies the oil pressure to a release side of torque converter 1 via oil passage 81. The oil drained from torque converter regulator valve 70 is supplied to lockup control valve 80 via oil passage 73 and then to an apply side of torque converter 1 via oil passage 82. The oil pressure drained from lockup control valve 80 is supplied to oil cooler 90 via oil passage 83. The oil passing through oil cooler 90 is cooled and supplied to lubrication parts of CVT 3 to be lubricated, and then returned to an oil pan, not shown. For example, the oil cooled is supplied to belt lubricating nozzle 94 and gear lubricating nozzle 95 via oil passage 91, oil filter 92 and oil passage 93. The oil supplied to belt lubricating nozzle 94 is injected to belt 34 of CVT 3. The oil supplied to gear lubricating nozzle 95 is injected to differential gear 96.

Figure 3:
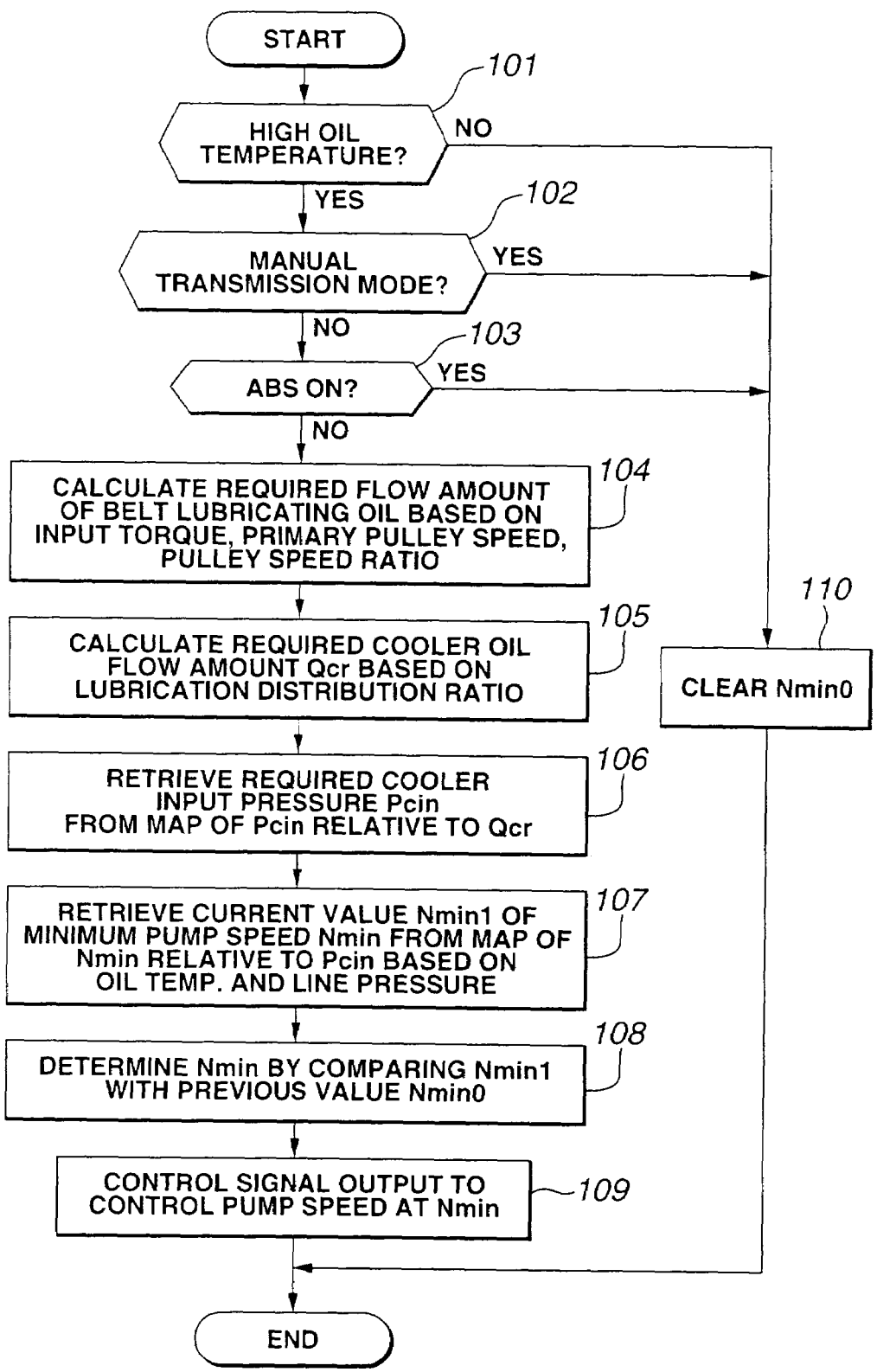
FIG. 3 is a flow chart of a routine of determining oil pump speed which is executed in the first embodiment.

Referring now to FIG. 3, a control logic of the first embodiment of the system or method according to the present invention is explained. The control logic is executed by CVT controller 9. Logic flow starts and goes to block 101 where it is determined whether the oil temperature in CVT 3 is high. Namely, at block 101, a determination as to whether the oil temperature in CVT 3 is not less than a predetermined value is made based on oil temperature signal Toil from oil temperature sensor 11. In this embodiment, the predetermined value is in a range of 120° C.–130° C. When the answer to block 101 is yes, the logic flow proceeds to block 102. At block 102, a determination as to whether CVT 3 is in the manual transmission mode is made based on signal MM/AM from transmission mode sensor 16. When the answer to block 102 is no, indicating that CVT 3 is in the automatic transmission mode, the logic flow proceeds to block 103. At block 103, a determination as to whether ABS is in the operating condition is made based on signal ABS ON/OFF from ABS sensor 17. When the answer to block 103 is no, the logic flow proceeds to block 104.

At block 104, required belt lubricating oil flow amount Qbr which is an oil flow amount required for lubricating belt 34 of CVT 3 is calculated based on input torque TQin, primary pulley speed Np and pulley speed ratio PSR. Input torque TQin is calculated based on throttle opening degree signal TVO from throttle position sensor 10. Pulley speed ratio PSR is calculated based on primary pulley speed signal Np from primary pulley speed sensor 4 and secondary pulley speed Ns from secondary pulley speed sensor 5. Specifically, the calculation of required belt lubricating oil flow amount Qbr is performed using a table as shown in FIG. 4.

The table of FIG. 4 has maps No. 1 to No. 9 corresponding to differences in input torque TQin, pulley speed ratio PSR and primary pulley speed Np. One map is selected from maps No. 1 to No. 9 on the basis of input torque TQin, primary pulley speed Np and pulley speed ratio PSR. For instance, when input torque TQin is large, pulley speed ratio PSR is b, and primary pulley speed Np is B, map No. 2 is selected. FIG. 5 illustrates map No. 2 showing a relationship between required belt lubricating oil flow amount Qbr and primary pulley speed Np. Required belt lubricating oil flow amount Qbr is retrieved from map No. 2 based on primary pulley speed Np.

The logic flow proceeds to block 105 where required cooler oil flow amount Qcr which is an oil flow amount required to be supplied to oil cooler 90 is calculated from required belt lubricating oil flow amount Qbr calculated at block 104, on the basis of a predetermined oil distribution ratio. Here, the predetermined oil distribution ratio means a ratio of an oil flow amount to be supplied from oil cooler 90 to a belt lubricating oil supply passage formed by oil passage 93 and belt lubricating nozzle 94, to an oil flow amount to be supplied from oil cooler 90 to a lubricating oil supply path which is located downstream of oil cooler 90 and includes oil passage 91, the belt lubricating oil supply passage and gear lubricating nozzle 95. In other words, the predetermined oil distribution ratio is a ratio of required belt lubricating oil flow amount Qbr to an oil flow amount passing through oil cooler 90. In this embodiment, the predetermined oil distribution ratio is about 1:2.

The logic flow proceeds to block 106 where required cooler input pressure Pcin which is an oil pressure required to be supplied to oil cooler 90 is calculated based on required cooler oil flow amount Qcr calculated at block 105. Specifically, required cooler input pressure Pcin is retrieved from a map as shown in FIG. 6, based on required cooler oil flow amount Qcr calculated at block 105. FIG. 6 illustrates an example of the map showing a relationship between required cooler oil flow amount Qcr and required cooler input pressure Pcin which is established corresponding to line pressure LP.

Figure 7:
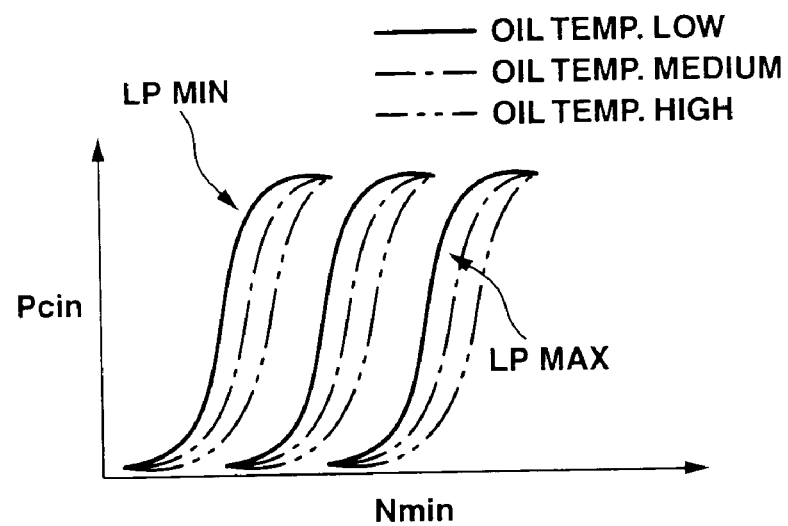
FIG. 7 is a map showing a relationship between cooler input pressure and oil pump minimum speed at different oil temperatures and line pressures.

The logic flow proceeds to block 107 where current minimum speed Nminl of oil pump 8, namely, engine minimum speed, is calculated based on required cooler input pressure Pcin calculated at block 106. Specifically, current minimum speed Nminl is retrieved from a map as shown in FIG. 7, based on required cooler input pressure Pcin calculated at block 106. The map of FIG. 7 shows a relationship between required cooler input pressure Pcin and oil pump minimum speed Nmin which established for each oil temperature Toil and each line pressure LP.

The logic flow proceeds to block 108. At block 108, oil pump minimum speed Nmin is determined by comparing current minimum speed Nmin1 with previous minimum speed Nmin0 calculated in the control routine previously executed. Specifically, by the comparison between current minimum speed Nmin1 and previous minimum speed Nmin0, a larger one thereof is selected and determined as desired oil pump minimum speed Nmin. The logic flow proceeds to block 109. At block 109, control signal CS is outputted to hydraulic control valve unit 6 to change the transmission ratio of CVT 3 and control and hold the engine speed, namely, the oil pump speed, at minimum speed Nmin. The logic flow then goes to end.

When the answer to block 101 is no, the logic flow jumps to block 110 where previous minimum speed Nmin0 calculated in the previously executed control routine is cleared. The logic flow then goes to end. When the answer to block 102 is yes, indicating that CVT 3 is in the manual transmission mode, the logic flow jumps to block 110. When the answer to block 103 is yes, indicating that ABS is in the ON state, the logic flow jumps to block 110.

As explained above, in the first embodiment of the system and method, CVT controller 9 calculates required belt lubricating oil flow amount Qbr based on at least one of the following operating conditions:

1) input torque TQin of CVT 3;
2) primary pulley speed Np of CVT 3; and
3) transmission ratio (pulley speed ratio) of CVT 3.

Therefore, the system and method of the first embodiment can suppress an unnecessary lubricating oil flow amount in comparison with the above-described conventional art which calculates a required belt lubricating oil flow amount based on only oil temperature. This serves for alleviating load of an oil pump driving source such as an engine and preventing a rotational speed of the driving source from unnecessarily increasing under high oil temperature condition. Further, CVT controller 9 calculates required cooler input pressure Pcin based on required cooler oil flow amount Qcr and determines oil pump minimum speed Nmin based on required cooler input pressure Pcin, oil temperature Toil and line pressure LP. The system and method of the first embodiment can determine oil pump minimum speed Nmin with enhanced accuracy in comparison with the above-described conventional art.

Further, when CVT 3 is in the manual transmission mode, CVT controller 9 clears oil pump minimum speed Nmin0 determined in the previous control routine. This allows the control that assigns a priority to the operating condition requested by a vehicle operator.

Furthermore, since CVT controller 9 clears oil pump minimum speed Nmin0 calculated in the previously executed control routine upon ABS being in operation, the oil pump speed control can cause no interference with the ABS operation.

Figure 8:
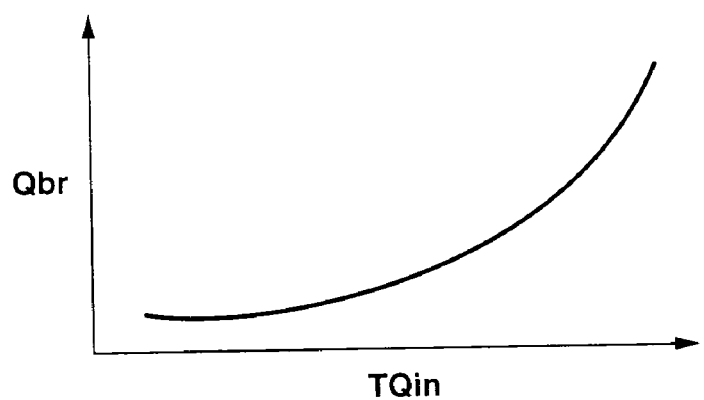
FIG. 8 is a map showing a relationship between required belt lubricating oil flow amount and CVT input torque.
Figure 9:
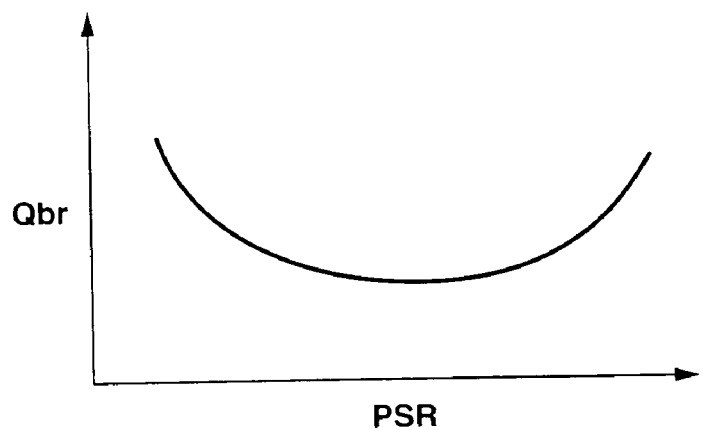
FIG. 9 is a map showing a relationship between required belt lubricating oil flow amount and pulley speed ratio.

Maps or tables for calculating required belt lubricating oil flow amount Qbr are not limited to those shown in FIGS. 4 and 5. Maps shown in FIGS. 8 and 9 can also be used to calculate required belt lubricating oil flow amount Qbr. The map shown in FIG. 8 illustrates a relationship between input torque TQin and required belt lubricating oil flow amount Qbr. The map shown in FIG. 9 illustrates a relationship between pulley speed ratio PSR and required belt lubricating oil flow amount Qbr. Further, required belt lubricating oil flow amount Qbr may be calculated using suitable mathematical expressions.

Figure 10:
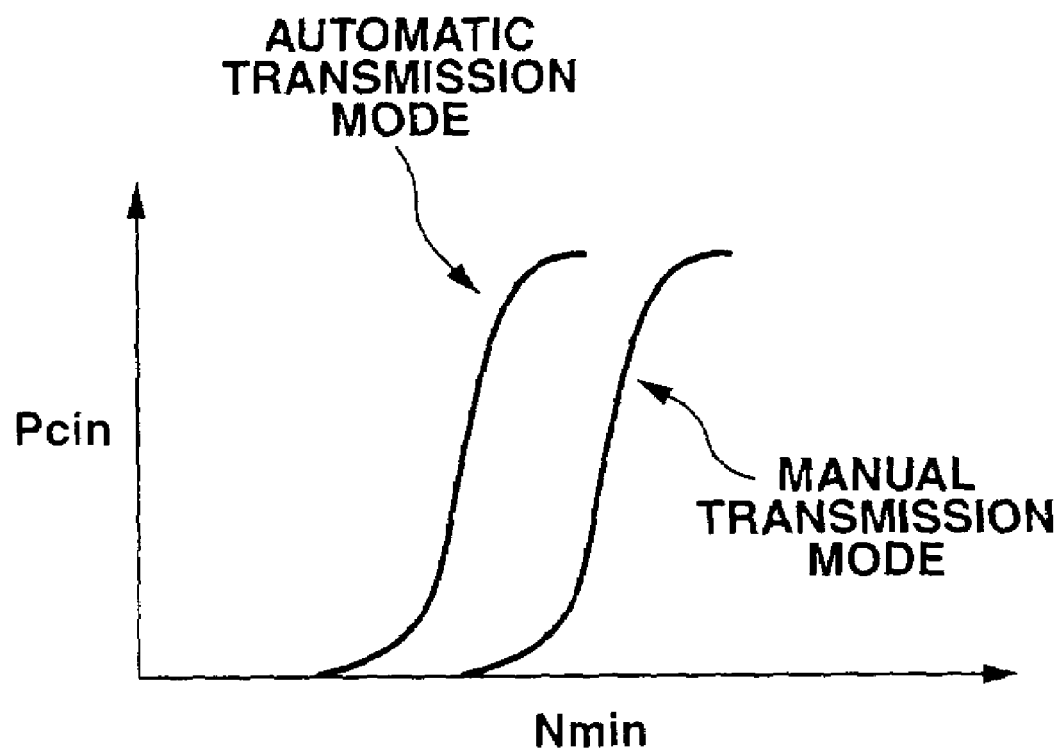
FIG. 10 is a map used in a second embodiment of the present invention, showing a relationship between cooler input pressure and oil pump minimum speed in a manual transmission mode and an automatic transmission mode.

Referring to FIGS. 10 and 11, a second embodiment of the system and method according to the present invention will be explained hereinafter. FIG. 11 shows a control logic of the second embodiment which differs in block 210 and block 212 from the control logic of the first embodiment as shown in FIG. 3. The control logic of the second embodiment is also executed by CVT controller 9. When the answer to block 102 is yes, indicating that CVT 3 is in the manual transmission mode, the logic flow jumps to block 210. At block 210, oil pump minimum speed Nmin required in the manual transmission mode is determined using a map shown in FIG. 10. The map of FIG. 10 illustrates a relationship between oil pump minimum speed Nmin and required cooler input pressure Pcin in each of the manual transmission mode and the automatic transmission mode. Specifically, at block 210, oil pump minimum speed Nmin required in the manual transmission mode is retrieved from the map of FIG. 10, based on required cooler input pressure Pcin. As illustrated in FIG. 10, minimum speed Nmin in the manual transmission mode is set larger than that in the automatic transmission mode. Meanwhile, the map of FIG. 10 is only illustrative under typical conditions of oil temperature Toil and line pressure LP. Although there is not shown in the map, as oil temperature Toil and line pressure LP increase, oil pump minimum speed Nmin is set larger, similar to FIG. 7.

At block 212, oil pump minimum speed Nmin required in the automatic transmission mode is determined using the map shown in FIG. 10. Specifically, oil pump minimum speed Nmin required in the automatic transmission mode is retrieved from the map of FIG. 10, based on required cooler input pressure Pcin.

In the second embodiment, when CVT 3 is in the manual transmission mode, CVT controller 9 sets oil pump minimum speed Nmin larger than in the automatic transmission mode. Owing to the determination of the larger minimum speed Nmin, an oil flow amount required for lubrication can be obtained. The reason is as follows. Load in the manual transmission mode is usually larger than that in the automatic transmission mode. This causes increase in the required cooler oil flow amount and the lubricating oil flow amount, and increase in the oil flow amount that is used in the pulleys in order to enhance the transmission speed of the CVT. As a result, the oil pressure to be supplied to the oil cooler is reduced.

Although oil pump 8 is directly driven by the engine in the first and second embodiments, oil pump 8 may be driven by a motor.

This application is based on a prior Japanese Patent Application No. 2002-285500 filed on Sep. 30, 2002. The entire contents of the Japanese Patent Application No. 2002-285500 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A hydraulic control system for a belt-drive continuously variable transmission (CVT) of a vehicle, the CVT including a belt, the hydraulic control system comprising:
   an oil pump operative to produce an oil pressure and an oil flow amount which are supplied to the CVT;
   a pressure regulator valve operative to regulate the oil pressure produced by the oil pump;

a belt lubricating oil supply passage for supplying oil to the belt on a downstream side of the pressure regulator valve;

engine operating condition detecting means for detecting an engine operating condition and generating an engine operating condition signal, the engine operating condition detecting means including an oil temperature sensor operative to: detect a temperature of the oil in the CVT; and generate an oil temperature signal indicative of the oil temperature detected;

an oil cooler disposed on a downstream side of the pressure regulator valve;

a lubricating oil supply path for supplying the oil to lubrication parts in the CVT, the lubricating oil supply path being disposed on a downstream side of the oil cooler and including the belt lubricating oil supply passage;

line pressure detecting means for:
detecting a line pressure between the oil pump and the pressure regulator valve; and
generating a line pressure signal indicative of the line pressure detected; and a controller for controlling the oil flow amount based on the engine operating condition signal, which is generated based on the oil temperature signal and the line pressure signal, the controller being programmed to:
calculate a CVT input torque based on the engine operating condition signal;
calculate a required belt lubricating oil flow amount to be supplied to the belt on the basis of the engine operating condition signal and the CVT input torque;
calculate a required cooler oil flow amount to be supplied to the oil cooler from the required belt lubricating oil flow amount on the basis of a predetermined oil distribution ratio of an oil flow amount to be supplied to the belt lubricating oil supply passage to an oil flow amount to be supplied to the lubricating oil supply path;
calculate a cooler input pressure required to supply the oil to the oil cooler on the basis of the required cooler oil flow amount;
determine a minimum speed of the oil pump that is required to provide the cooler input pressure, on the basis of the oil temperature signal and the line pressure signal; and
control the oil pump at the minimum speed.

2. The hydraulic control system as claimed in claim 1, wherein the engine operating condition detecting means comprises a throttle position sensor operative to detect a throttle opening degree and to generate a throttle opening degree signal indicative of the throttle opening degree detected.

3. The hydraulic control system as claimed in claim 1, wherein the CVT includes a primary pulley,
wherein the hydraulic control system further comprises:
primary pulley speed detecting means for:
detecting rotational speed of the primary pulley; and
generating a primary pulley speed signal indicative of the rotational speed detected,
wherein the controller is configured to receive the primary pulley speed signal, and
wherein the controller is programmed to calculate the required belt lubricating oil flow amount based on at least one of the CVT input torque and the primary pulley speed signal when the oil temperature is not less than a predetermined value.

4. The hydraulic control system as claimed in claim 3, wherein the CVT includes a secondary pulley,
wherein the hydraulic control system further comprises:
secondary pulley speed detecting means for:
detecting rotational speed of the secondary pulley; and
generating a secondary pulley speed signal indicative of the rotational speed detected,
wherein the controller is configured to receive the secondary pulley speed signal, and
wherein the controller is programmed to:
calculate a pulley speed ratio between the rotational speed of the primary pulley and the rotational speed of the secondary pulley; and
calculate the required belt lubricating oil flow amount based on at least one of the CVT input torque, the primary pulley speed signal, and the pulley speed ratio when the oil temperature is not less than the predetermined value.

5. The hydraulic control system as claimed in claim 4, wherein the CVT has a manual transmission mode allowing to manually change the pulley speed ratio,
wherein the hydraulic control system further comprises:
transmission mode detecting means for:
detecting that the CVT is in the manual transmission mode; and
generating a manual mode signal indicative of the CVT in the manual transmission mode; and
wherein the controller is programmed, in response to the manual mode signal, to clear the minimum speed of the oil pump.

6. The hydraulic control system as claimed in claim 4, wherein the CVT has a manual transmission mode allowing to manually change the pulley speed ratio and an automatic transmission mode allowing to automatically change the pulley speed ratio,
wherein the hydraulic control system further comprises:
transmission mode detecting means for:
detecting whether the CVT is in the manual transmission mode or in the automatic transmission mode; and
generating a manual mode signal indicative of the CVT in the manual transmission mode and an automatic mode signal indicative of the CVT in the automatic transmission mode, and
wherein the controller is programmed, in response to the manual mode signal, to set the minimum speed of the oil pump larger than in the automatic transmission mode.

7. The hydraulic control system as claimed in claim 1, wherein the vehicle comprises:
an anti-lock brake system (ABS) actuator operative to control a braking pressure;
an ABS control unit for generating an ABS control signal to the ABS actuator; and
an ABS control sensor operative to: detect the ABS control signal; and generate an ABS control ON signal indicative of ABS control being conducted, and
wherein the controller is programmed, in response to the ABS control ON signal, to clear the minimum speed of the oil pump.

8. The hydraulic control system as claimed in claim 1, wherein the belt lubricating oil supply passage comprises a belt lubricating nozzle for injecting the oil to the belt, and wherein the lubricating oil supply path comprises a gear lubricating nozzle for injecting the oil to a differential gear.

9. A method for controlling a belt-drive continuously variable transmission (CVT) of a vehicle, the CVT including a belt, the vehicle including an oil pump operative to produce an oil pressure and an oil flow amount which are supplied to the CVT, a pressure regulator valve operative to regulate the oil pressure produced by the oil pump, a belt lubricating oil supply passage for supplying oil to the belt on a downstream side of the pressure regulator valve, an oil cooler disposed on the downstream side of the pressure regulator valve, and a lubricating oil supply path for supplying the oil to lubrication parts in the CVT, the lubricating oil supply path being disposed on a downstream side of the oil cooler and including the belt lubricating oil supply passage, the method comprising:

generating an engine operating condition signal indicative of an engine operating condition, the engine operating condition signal being based on an oil temperature signal indicative of a temperature of the oil in the CVT and a line pressure signal indicative of a line pressure between the oil pump and the pressure regulator valve;

calculating a CVT input torque based on the engine operating condition signal;

calculating a required belt lubricating oil flow amount to be supplied to the belt on the basis of the engine operating condition signal and the CVT input torque;

calculating a required cooler oil flow amount to be supplied to the oil cooler from the required belt lubricating oil flow amount on the basis of a predetermined oil distribution ratio of an oil flow amount to be supplied to the belt lubricating oil supply passage to an oil flow amount to be supplied to the lubricating oil supply path;

calculating a cooler input pressure required to supply the oil to the oil cooler on the basis of the required cooler oil flow amount;

determining a minimum speed of the oil pump that is required to provide the cooler input pressure, on the basis of the oil temperature signal and the line pressure signal; and controlling the oil pump at the minimum speed.

10. The method as claimed in claim 9,
wherein the engine operating condition signal comprises a throttle opening degree signal, and
wherein the CVT input torque is calculated based on the throttle opening degree signal.

11. The method as claimed in claim 9,
wherein the CVT includes a primary pulley, and
wherein the method further comprises:
generating a primary pulley speed signal indicative of a rotational speed of the primary pulley;
calculating the required belt lubricating oil flow amount based on at least one of the CVT input torque and the primary pulley speed signal when the oil temperature is not less than a predetermined value.

12. The method as claimed in claim 11,
wherein the CVT includes a secondary pulley, and
wherein the method further comprises:
generating a secondary pulley speed signal indicative of a rotational speed of the secondary pulley;
calculating a pulley speed ratio between the rotational speed of the primary pulley and the rotational speed of the secondary pulley; and
calculating the required belt lubricating oil flow amount based on at least one of the CVT input torque, the primary pulley speed and signal, and the pulley speed ratio when the oil temperature is not less than the predetermined value.

13. The method as claimed in claim 12,
wherein the CVT has a manual transmission mode allowing to manually change the pulley speed ratio, and
wherein the method further comprises:
generating a manual mode signal indicative of the CVT in the manual transmission mode; and
clearing, in response to the manual mode signal, the minimum speed of the oil pump.

14. The method as claimed in claim 12,
wherein the CVT has a manual transmission mode allowing to manually change the pulley speed ratio and an automatic transmission mode allowing to automatically change the pulley speed ratio, and
wherein the method further comprises:
generating a manual mode signal indicative of the CVT in the manual transmission mode and an automatic mode signal indicative of the CVT in the automatic transmission mode; and
setting, in response to the manual mode signal, the minimum speed of the oil pump larger than in the automatic transmission mode.

15. The method as claimed in claim 9,
wherein the vehicle includes an anti-lock brake system (ABS) actuator operative to control a braking pressure and an ABS control unit for generating an ABS control signal to the ABS actuator, and
wherein the method further comprises:
generating an ABS control ON signal indicative of ABS control being conducted; and
in response to the ABS control ON signal, clearing the minimum speed of the oil pump.

16. The method as claimed in claim 9,
wherein the belt lubricating oil supply passage comprises a belt lubricating nozzle for injecting the oil to the belt, and
wherein the lubricating oil supply path comprises a gear lubricating nozzle for injecting the oil to a differential gear.

* * * * *